Jan. 4, 1966  D. R. CRAIG  3,227,059
PHOTOGRAPHIC REPRODUCTION METHOD AND APPARATUS
Filed Aug. 8, 1962

INVENTOR
DWIN R. CRAIG
BY Raymond W. Wootten
ATTORNEY

3,227,059
Patented Jan. 4, 1966

3,227,059
PHOTOGRAPHIC REPRODUCTION METHOD AND APPARATUS
Dwin R. Craig, Falls Church, Va., assignor to Logetronics, Inc., Alexandria, Va., a corporation of Delaware
Filed Aug. 8, 1962, Ser. No. 215,704
11 Claims. (Cl. 95—73)

This application is a continuation-in-part of application Serial No. 592,438, filed June 19, 1956.

This invention relates to a photographic reproduction method and apparatus whereby uniform exposure can be effected from subjects that would fail to produce such results in accordance with conventional practice. The present invention constitutes certain improvements over the disclosure of my application Serial No. 453,747, filed September 2, 1954, which has matured as Patent No. 2,842,025, dated July 8, 1958.

In accordance with this invention, a photographic reproduction method is contemplated for reducing gross contrast and substantially increasing detail contrast of elemental areas lacking in contrast comprising energizing a light source to a predetermined maximum operating intensity to produce a variable light beam, directing the beam to illuminate an elemental area of a subject to be reproduced with a spot of slightly greater area, scanning the subject with the spot and directing light produced by the spot from each portion of the subject to form a real image on a photosensitive surface and simultaneously expose the same, continuously sensing the intensity of the beam with a light intensity sensing device, and continuously modifying the light beam from and to the operating intensity as an inverse function of the intensity variations sensed due to variations in the light directing properties of the subject and independent of absolute values of intensity of the beam to produce substantially constant average exposure of all portions of the photosensitive surface. It is also contemplated to modify the light beam additionally as a function of the integrated value of light directed from a portion of the subject. The intensity of the beam is preferably the characteristic modified as a function of the sensed intensity variation, whereas the duration of the beam scanning period is preferably modified as a function of the integrated value of light. An important application of the invention contemplates that the subject be a transparency through which the light is directed and wherein the further modification of the light beam is a function of the density of a portion of the transparency.

The invention also contemplates photographic reproduction apparatus comprising supporting means for a subject and a photosensitive surface, a controllable light source for producing a beam to scan a subject on the support with a light spot slightly larger than the smallest elemental area of the subject to be reproduced and to expose the surface, a light intensity transduced disposed in the path of light directed by the subject from the source to the surface, and inverse feedback means in circuit with the transducer and source insensitive to absolute values of light detected by the transducer and responsive only to fluctuations of the beam corresponding to variations in light directing characteristics of the subject for controlling the beam and exposure thereby of each elemental area of the subject as an inverse function of intensity fluctuations sensed by the transducer. The light source is preferably a cathode ray tube and the transducer comprises a photoelectric device. A sensing means for modifying the duration of the scanning cycle preferably includes an integrating device. It is contemplated that a plurality of photoelectric devices be utilized, at least one of which will be in circuit with the transducer and one with the sensing means. It is also contemplated under such circumstances that one of the photoelectric devices be provided with means for modifying its field of view.

In accordance with the method and apparatus constituting the present invention, two independent feedback channels are contemplated. In this way, whereas a very dense negative and a very thin negative can possess the same pattern of density variations, prints produced therefrom can be subjected automatically to the same average level of exposure.

A more complete understanding of the invention will follow from a detailed description of the accompanying drawings wherein.

Figure 1:
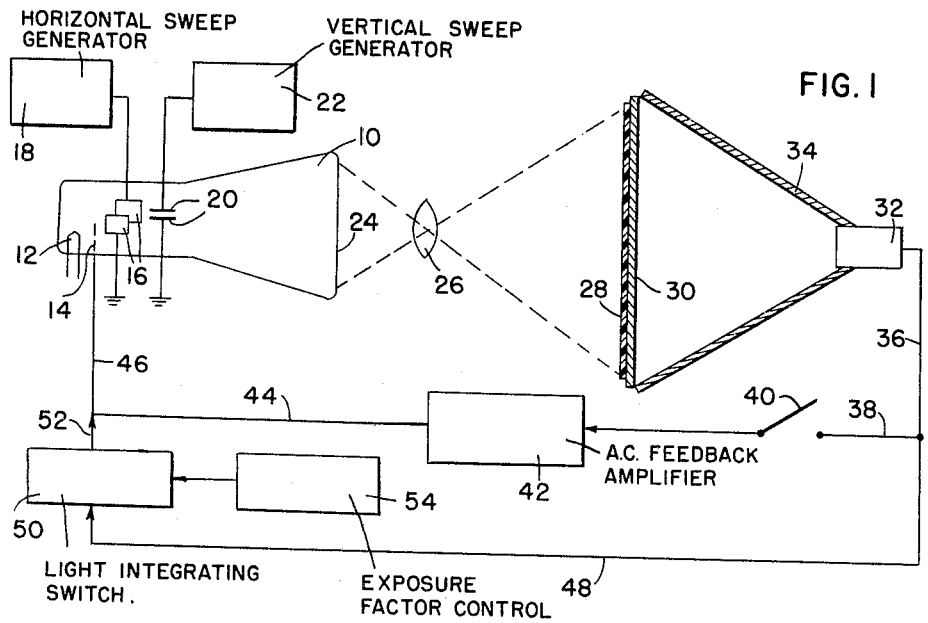
FIGURE 1 is a schematic view showing one form of the invention.

A cathode ray tube or kinescope 10 is provided with a cathode 12, a control grid 14, deflection plates 16 connected in circuit with a horizontal sweep generator 18, and deflection plates 20 connected in circuit with a vertical sweep generator 22. The electron beam produced by the tube produces light on a fluorescent screen 24 provided at the end of the tube from which light is directed through a suitable lens 26 and through a photographic transparency 28 to a photosensitized surface 30 on which the ultimate print will be formed. Where the screen of the cathode ray tube is as large as the transparency, the lens 26 can be omitted and the transparency and photosensitized surface moved more proximate to the fluorescent screen of the tube 10.

Figure 3:
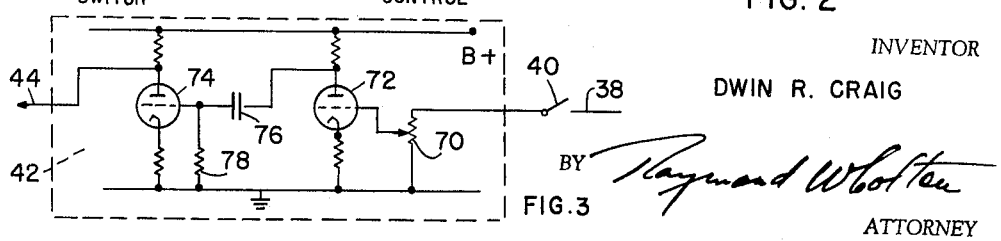
FIGURE 3 is a diagram of an A.C. amplifier constituting a portion of the circuit of each of the preceding figures.

Beyond the photosensitized surface 30 in the path of light produced by the cathode ray tube, a photomultiplier tube 32 is provided within a light collector 34 to sense the intensity of light transmitted through the transparency 28 and sensitized surface 30. The photomultiplier tube 32 is connected by means of a lead 36, lead 38, switch 40, an alternating current feedback amplifier 42, a conductor 44 and a conductor 46 to the grid 14 of the cathode ray tube so as to produce an inverse feedback effect which is a function of the intensity fluctuations sensed by the photomultiplier tube 32. The amplitude of the negative feedback can be adjusted to a desired degree as will be evident from the portion of the circuit depicted in more detail in FIG. 3.

The A.C. amplifier 42 has an even number of stages to assure a phase relationship that will produce a negative or inverse feedback. Signals from the photomultiplier or transducer 32 are applied through the lead 38 and switch 40 to a potentiometer 70 which permits adjustment of the portions of the signals which are to be applied to the grid of a triode 72. The output of the triode 72 is coupled to the grid of a triode 74 through a capacitor 76, as a result of which only alternating current components of the signals will occur in the output of the amplifier for control of the light source through the lead 44. Accordingly, an increase in light received by the photomultiplier 32 will result in a signal on the control electrode 14 whose polarity tends to decrease the light output of the cathode ray tube. The capacitor coupling between the amplifier stages prevents amplification of the very low frequencies of the photomuplier signals, permitting amplification of only the higher frequency signals produced by the intensity fluctuations sensed by the photomultiplier. The time constant which accounts for the distinction between low and high frequencies is provided by the capacitor 72 and a resistor 78. This time constant is selected to be substantially the time required to scan the subject. If, for example, the subject is scanned by the light beam at a rate of ten times per second, a time constant of one-tenth would be desired, and the values of the resistor 78 and the capacitor 76 would be selected accordingly. In this way, the output of the amplifier will contain only such higher frequencies as correspond with the intensity fluctuations sensed by the photomultiplier due to variations in the light directing properties of the subject, which in most cases will be the variations in the density of a transparency being scanned. Due to the use of the capacitance 76, no signals can appear on the lead 44 corresponding to absolute values of density of such a transparency. Hence the cathode ray tube will always operate at a brightness level determined by the dodging requirements of a transparency and independent of the average density of the transparency. Comparable results can be attained by the use of transformer coupling between the amplifier stages.

The photomultiplier tube 32 is also connected by its output lead 36 to a circuit including a lead 48, a light integrating device 50, a lead 52 and conductor 46 for further modifying the operation of the cathode ray tube. An exposure factor control device 54, which may assume the form of a variable voltage source adjusted by a potentiometer or a resistor, is shown as connected with the light integrating switch 50 for setting the desired level of exposure desired.

Since it will take less time to achieve a given exposure level through a thin negative than through a dense one, by feeding back only the A.C. component in combination with the integrating device, a substantial amount of time can be conserved in the production of prints from negatives which vary in density from one to the next.

With the present system, the A.C. feedback amplifier will respond only to variations in the density of the negative which will in turn, in the forms of the invention illustrated, produce fluctuations in the intensity of the light beam without regard to absolute brightness level.

Figure 2:
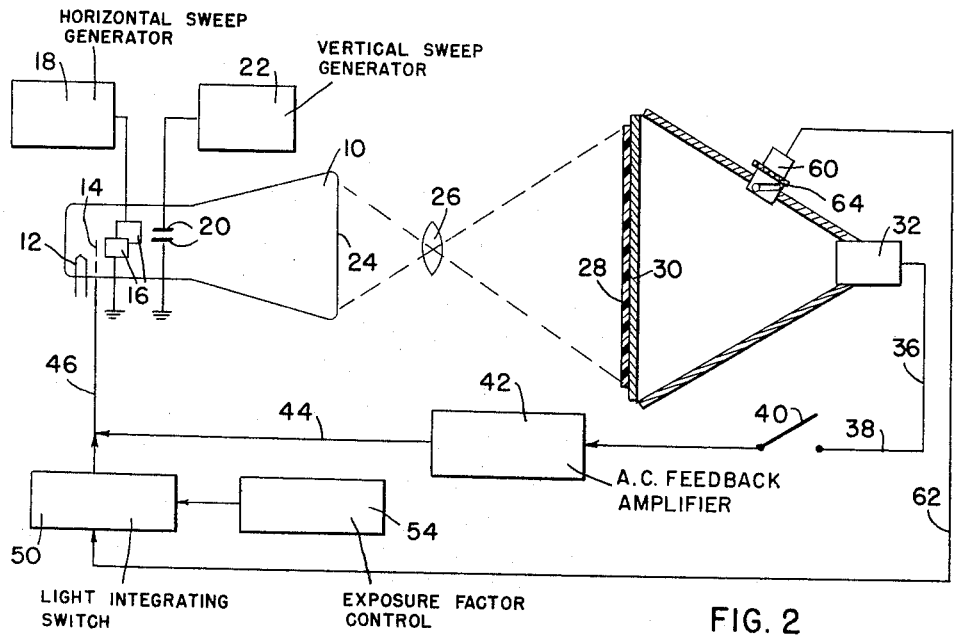
FIGURE 2 is a schematic view showing a modified form.

The form of the invention depicted in FIG. 2 differs from that of FIG. 1 in the provision of a second light sensing device such as a photomultiplier tube 60 independently supplying current through its lead 62 to the light integrating switch device 50. The photomultiplier tube 60 is depicted as housed in a casing having an adjustable sleeve 64 capable of relative movement so as to modify the field of view of this photomultiplier tube. In this manner, the brightness level can be determined by one or more portions of the transparency 28 as distinguished from its average density. In this manner, the adverse effects of undesired light passing around the borders of the negative will be avoided and the size and position of the controlling portion of the field of view can be selected to provide precise exposure of some center of interest that may be present.

Inasmuch as the foregoing disclosure will suggest further modifications to those skilled in the art, the examples shown and described should not be construed as limiting beyond the scope of the appended claims.

I claim:

1. Photographic reproduction apparatus comprising supporting means for a subject and a photosensitive surface, controllable light source for producing a beam to scan a subject on said support with a light spot slightly larger than the smallest elemental area of said subject to be reproduced and to expose said surface, a light intensity transducer means disposed in the path of light directed by said subject from said source to said surface, and inverse feedback means in circuit with said transducer means and source insensitive to absolute values of light detected by said transducer means and responsive only to fluctuations in the intensity of said beam corresponding to variations in light transmitting characteristics of said subject for controlling said beam and exposure thereby of each elemental area of said subject as an inverse function of intensity fluctuations densed by said transducer means.

2. Photographic reproduction apparatus according to claim 1 wherein said light source is a cathode ray tube.

3. Photographic reproduction apparatus according to claim 1 wherein said transducer means comprises a photoelectric device.

4. Photographic reproduction apparatus according to claim 1 including integrating means for interrupting said beam.

5. Photographic reproduction apparatus according to claim 1 wherein said inverse feedback means includes an A.C. amplifier whose output signals are independent of constant intensity signals applied to its input.

6. Photographic reproduction apparatus according to claim 4 wherein said transducer means comprises a photoelectric device in circuit with each of said inverse feedback means and integrating means.

7. Photographic apparatus as set forth in claim 6 wherein one of said photoelectric devices is provided with field of view modifying means.

8. A photographic reproduction method for reducing gross contrast and substantially increasing detail contrast of elemental areas lacking in contrast comprising energizing a light source to a predetermined maximum operating intensity to produce a variable light beam, directing said beam towards a transparency to illuminate an elemental area thereof with a spot of slightly greater area, scanning said transparency with said spot and directing light produced by said spot through each portion of said transparency to form a real image on a photosensitive surface and simultaneously expose the same, continuously sensing the intensity of said beam with a light intensity sensing device, and continuously modifying said light beam from and to said operating intensity as an inverse function of intensity variations sensed due to density variations of said transparency and independent of absolute values of intensity of said beam to produce substantially constant average exposure of all portions of the photosensitive surface.

9. A photographic reproduction method according to claim 8 wherein the intensity of said beam is modified as a function of the sensed intensity fluctuations.

10. A photographic reproduction method according to claim 8 wherein the duration of said beam is modified as a function of the integrated value of light with respect to time.

11. A photographic reproduction method for reducing gross contrast and substantially increasing detail contrast of elemental areas lacking in contrast comprising energizing a light source to a predetermined maximum operating intensity to produce a variable light beam, directing said beam to illuminate an elemental area of a subject to be reproduced with a spot of slightly greater area, scanning said subject with said spot and directing light produced by said spot from each portion of said subject to form a real image on a photosensitive surface and simultaneously expose the same, continuously sensing the intensity of said beam with a light intensity sensing device, and continuously modifying said light beam from and to said operating intensity as an inverse function of intensity variations sensed due to light directing variations of the subject and independent of absolute values of intensity of said beam to produce substantially constant average exposure of all portions of the photosensitive surface, integrating the total quantity of light received by a portion of said subject, and further modifying the intensity of said light beam as a function of the light thus integrated.

References Cited by the Examiner

UNITED STATES PATENTS

| | | | |
|---|---|---|---|
| 2,444,675 | 7/1948 | Rath | 88—24 |
| 2,480,425 | 8/1949 | Simmon | 96—27 X |
| 2,789,491 | 4/1957 | Blandhoel et al. | 95—73 |
| 2,960,019 | 11/1960 | Craig | 95—73 |
| 3,035,912 | 5/1962 | Le Massena et al. | 96—27 |
| 3,035,913 | 5/1962 | Hellmig | 96—27 |

EVON C. BLUNK, *Primary Examiner.*

N. G. TORDIN, *Examiner.*

A. E. TANENHOLTZ, *Assistant Examiner.*